April 22, 1958  R. J. McGARRY  2,831,807
NEUTRONIC REACTOR
Filed July 22, 1953  3 Sheets-Sheet 1
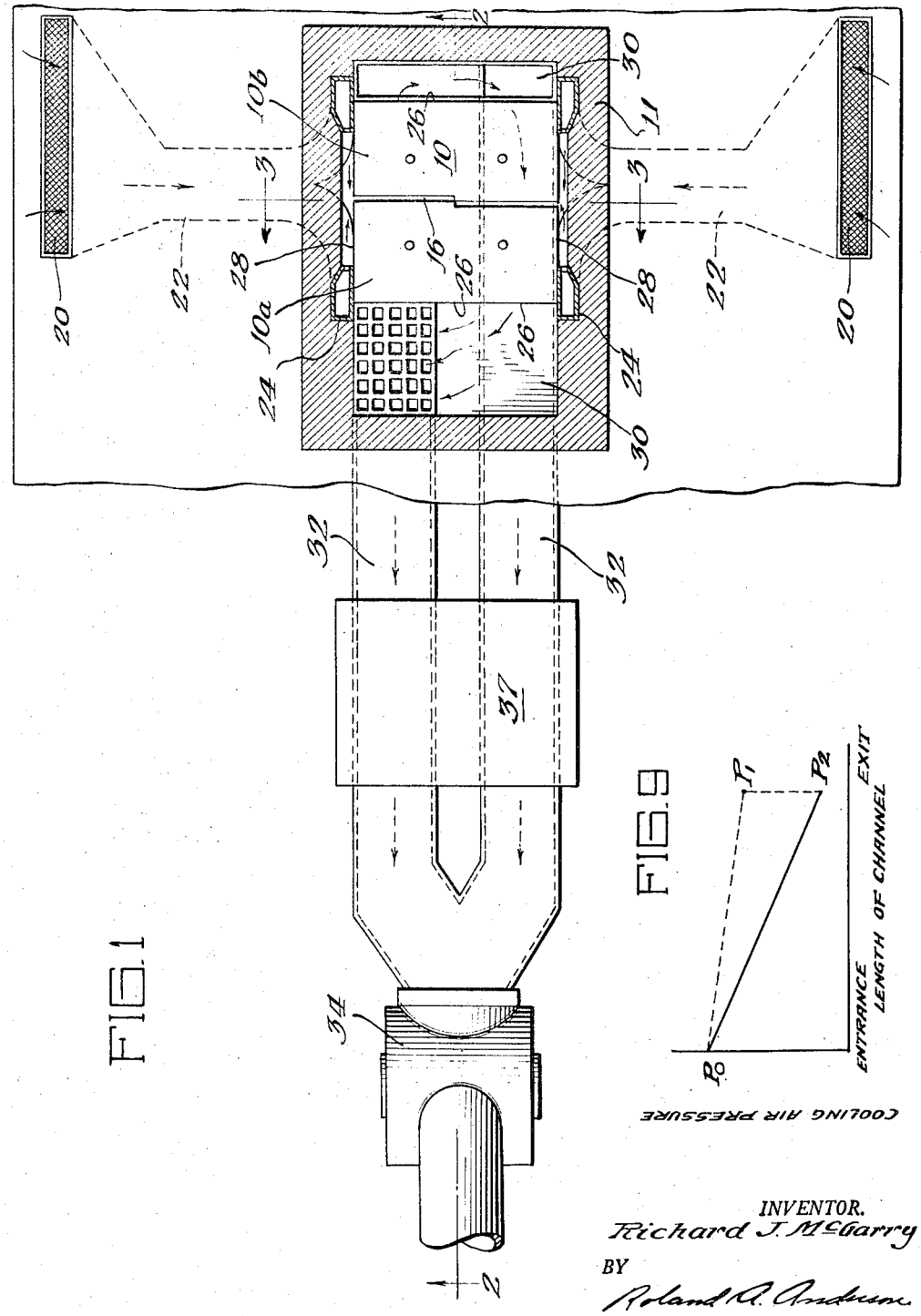
INVENTOR.
Richard J. McGarry
BY
Roland R. Anderson
Attorney

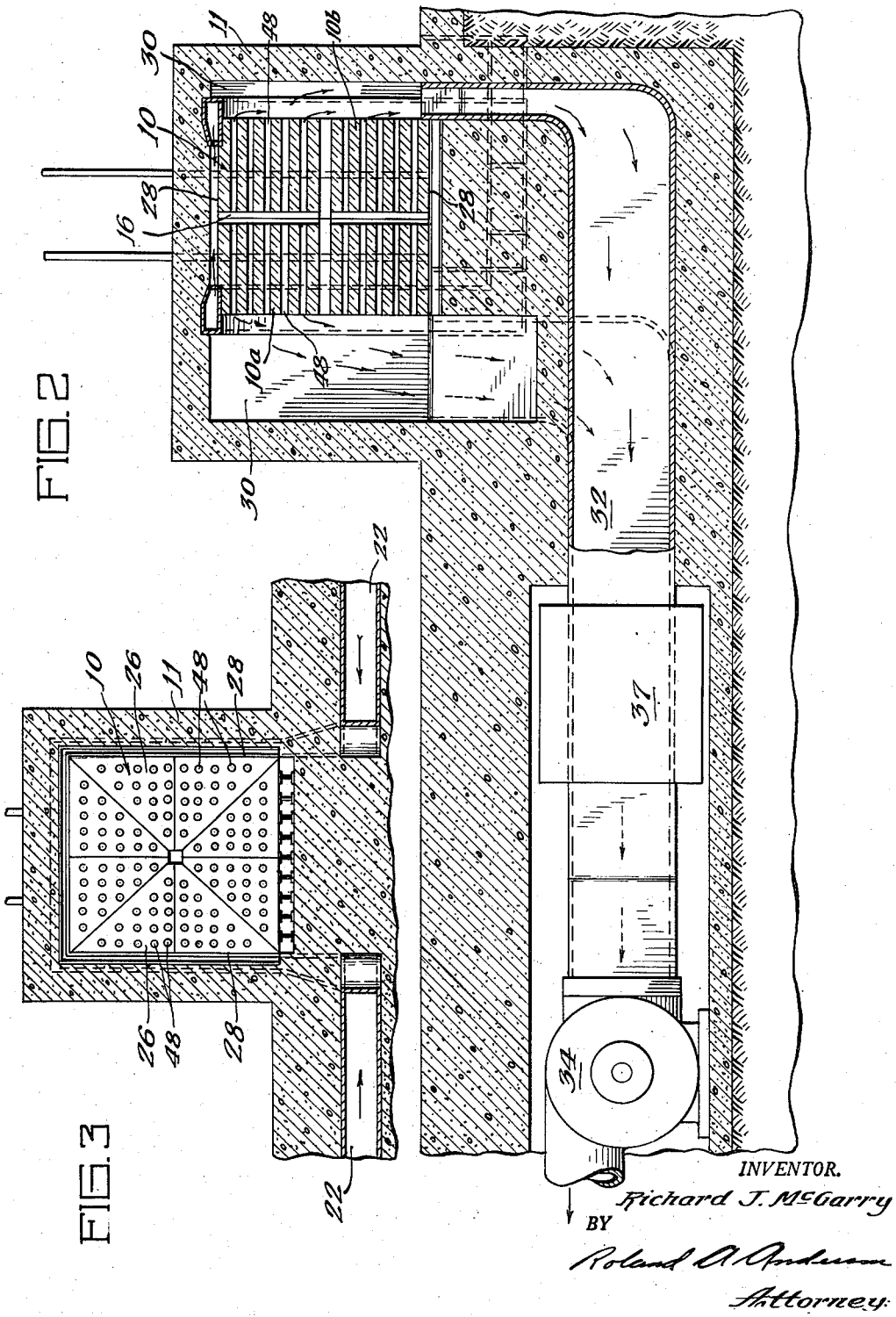

April 22, 1958  R. J. McGARRY  2,831,807
NEUTRONIC REACTOR
Filed July 22, 1953  3 Sheets—Sheet 3
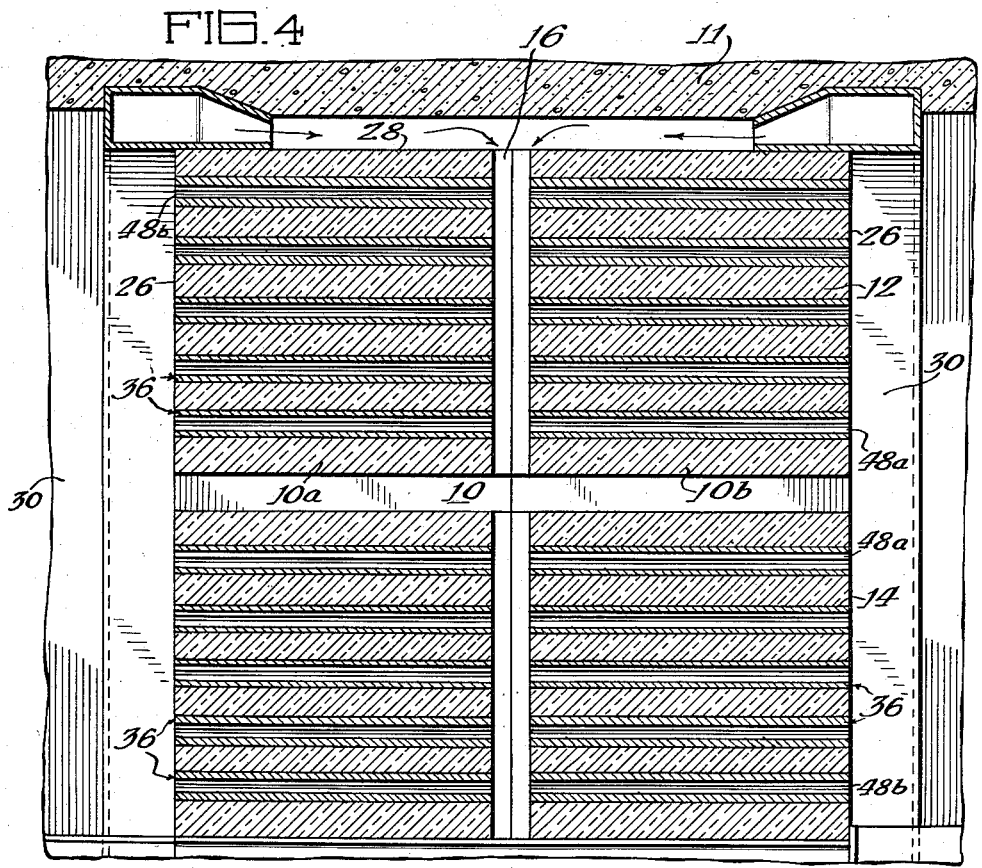
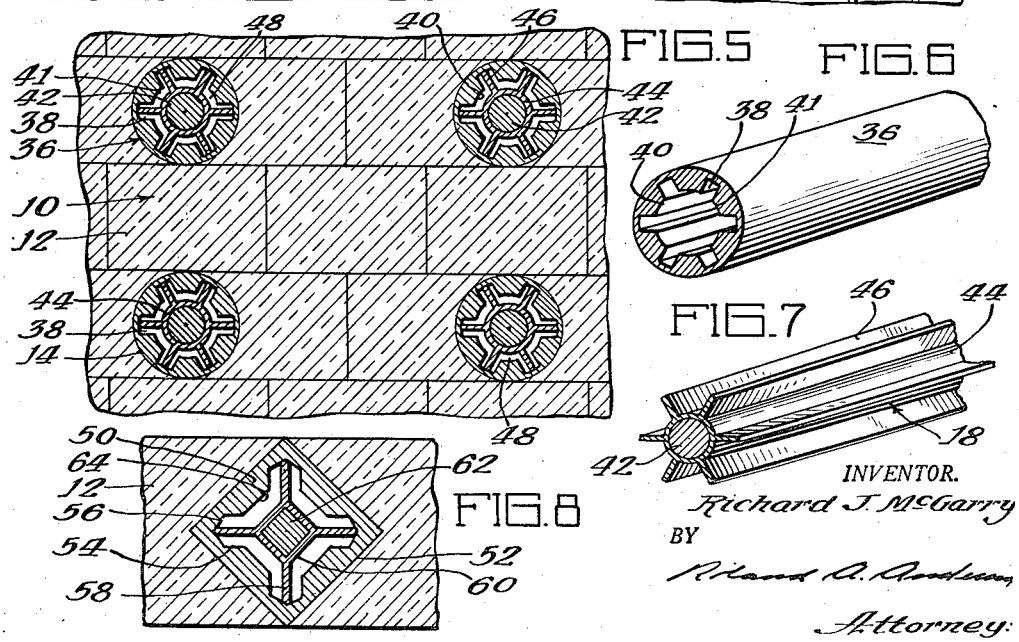
INVENTOR.
Richard J. McGarry
BY
Attorney

United States Patent Office 2,831,807
Patented Apr. 22, 1958

2,831,807
NEUTRONIC REACTOR

Richard J. McGarry, Rutland, Vt., assignor to the United States of America as represented by the United States Atomic Energy Commission Application July 22, 1953, Serial No. 387,553

9 Claims. (Cl. 204—193.2)

This invention relates generally to fluid cooled neutronic reactors and in particular to an improvement in the construction thereof which permits more efficient cooling.

When a neutron strikes the nucleus of an atom of a fissionable material and causes that atom to split, a large quantity of energy is liberated, a major portion of which appears as heat. The heat liberated may be used to perform work or it may be disposed of as an undesirable by-product of the nuclear reaction. If the heat is to be used to perform work, the efficiency of the heat removal process becomes very significant as it affects the amount of work which can be obtained from a given amount of heat liberated in the reactor. Even if the heat is to be considered as an undesirable by-product, means still must be provided to remove the heat, particularly if the power level of the reactor is substantial.

Many different cooling mechanisms have been devised for neutronic reactors. Generally, it has been found necessary that the coolant be pumped through the reactor so that the quantity of heat removed is sufficient to maintain the reactor temperature below certain critical limits, which limits are determined by the materials of construction, the metallurgical properties of the fuel elements and other factors. In addition to the capability of transferring heat from the reactor, the coolant must possess other desirable intrinsic properties such as a relatively low neutron capture cross section and stability to nuclear radiation. Suitable coolants and their desirable properties are described in the application of Enrico Fermi and Leo Szilard (S. N. 568,904), filed December 19, 1944, now Patent No. 2,708,656, issued May 17, 1955.

One satisfactory and easily obtained coolant is air and a reactor using air as a coolant is described in the application of Robert W. Powell (S. N. 287,822), filed May 15, 1952, now abandoned. This application contains a description of an air cooled neutronic reactor constructed of bricks of a solid neutron moderator, graphite. A large number of cooling channels of uniform circular cross section are formed in the moderator and these channels are partly filled with bodies containing the fissionable fuel. The cooling air is introduced through a central gap in the active part of the reactor and flows outward from the gap through the channels. The fuel bodies are sealed in containers which are provided with longitudinal fins to increase the heat transfer surface. The channel diameters must be larger than the diameter of the finned containers to avoid damage to the fins during loading and unloading in the channels, since the fins must be kept relatively thin to favor their heat transfer properties. The containers thus rest by gravity on their relatively thin fins within the channels. One of the problems that arises because of this configuration of the fuel bodies in the channels within the moderator, is a tendency for the elements to become cooled unevenly. This tendency results from the difference in spacing between the bottom of the fuel bodies and the bottom of the channel on which the fins rest as compared with the spacing between the top of the fuel bodies and the top of the channel. Less cooling air passes beneath the fuel bodies than passes above them and the air passing into contact with the lower portion of a fuel body at the entrance to the channel is confined to contact with this lower portion for the entire length of the channel since the fins supporting the body rest on the bottom of the channel and thus form a confining trapezoidal passage through which a smaller amount of coolant must pass. By contrast the larger amount of coolant passing into contact with the upper portion of the fuel body has greater freedom of mobility. The net result is an uneven cooling of the fuel bodies leading to the following undesirable effects:

Firstly, an uneven cooling sets up a transverse temperature gradient from top to bottom through a section of the fuel element. Since this gradient exists through the length of the bar, the lower or warmer portion of the bar tends to expand more, and the cooler or upper portion of the bar tends to expand less, as the reactor becomes heated and the coolant is flowed therethrough, so that a bowing of the fuel element occurs. Since the temperature of the reactor is raised and lowered as the reactor is operated intermittently, this gradient is developed and relieved at intervals thus placing an intermittent strain on the jacket in which the fuel element is enclosed and increasing the probability of rupture of the jacket. As will be apparent, the jacket must remain sealed to prevent chemical burning or oxidation of the fuel.

Secondly, an uneven cooling results in the danger of localized overheating of the lower portions of the fuel bodies. One of the deterious effects which may be produced by this localized overheating is a tendency for the portions of the fuel element which are subjected to excessive heat to change in their crystalline structure. The change of structure from that existing at lower temperatures to that existing at higher temperatures also increases the possibility of warpage of the fuel element and thus also increases the probability of rupture of the fuel element jacket. Where the danger of such localized overheating is present, it is necessary to operate the reactor at a lower overall temperature so that even if such localized overheatings occur, the maximum permissible temperature will not be exceeded. Such maximum permissible temperature is that beyond which the materials of construction may be subject to failure and beyond which the crystalline structure of the fuel element will be materially altered.

While these results flow from the development of excessive localized temperature gradients, they are principally important in maintaining safe operation of the pile regardless of whether the power generated by the pile is to be recovered for useful purposes or not.

Furthermore, when it is desired to recover power from a neutronic reactor, an additional and more general temperature gradient regulation becomes important. In recovering the heat generated in a reactor, it is obviously desirable that a minimum quantity of coolant be passed through the reactor since energy must be expended in forcing such coolant through the reactor and this coolant should desirably be heated to a maximum temperature since greater power recovery can be effected from a smaller quantity of a medium at a higher temperature rather than from a larger quantity of the same medium at a lower temperature. However, the rate of heat generation at any point in a reactor is approximately proportional to the neutron flux at that point. Since the neutron flux is greatest at the central portion of the reactor and diminishes as the peripheral portions are approached, the temperature at the center of the reactor is higher than that of the periphery. There is thus an overall temperature gradient in a reactor having the construction described above, the temperature being highest in the central portion and diminishing toward the periphery.

For obvious practical reasons, the coolant which is flowed through such an air-cooled, graphite-moderated neutronic reactor is passed into the reactor from a common source and flows from the reactor into a common exhaust. Since the terminal pressure conditions are the same for all channels, the flow rates through all channels are essentially the same. Thus, if such flow is sufficient to cool the fuel elements at the central or higher temperature portion of the neutronic reactor, such flow is in excess of that needed to cool the fuel elements in the peripheral portions of the reactor and, since the hotter gases passing from the hotter fuel elements in the center of the reactor are combined with lower temperature gas passing from the excessively cooled fuel elements at the periphery of the reactor, a consequent loss of as much as 50% of the total of the potential power of the reactor occurs.

With the foregoing limitations of neutronic reactor construction in mind, the application of this invention to the reactor cooling field will become more apparent as the description proceeds.

It is accordingly one object of this invention to provide means for regulating coolant flow through the coolant channels of a neutronic reactor.

It is another object of this invention to render substantially uniform the temperature of neutronic fuel bar bodies in a fluid cooled neutronic reactor by the elimination of both local and overall temperature gradients.

Still another object is to make more efficient use of the coolant in a neutronic reactor of the type described.

Other objects will be in part apparent and in part pointed out hereinafter.

These and other objects are accomplished by restricting the flow of coolant, initially at a single pressure head, through the peripheral channels of a neutronic reactor and diminishing the extent of the restriction in flow toward the center of the reactor. The invention resides, broadly speaking, in the combination of a longitudinally finned, fuel-bearing body mounted within a peculiar flow-governing restriction. This flow restriction preferably comprises an interiorly grooved bushing removably mounted within the channels and permits a substantially uniform flow of cooling medium longitudinally along the periphery of a given fuel-bearing body which in turn is disposed in the bushing in spatial relation thereto.

The invention will be better understood on reference to the accompanying drawings in which Figure 1 is a plan view, partly in section, of an air-cooled neutronic reactor of the type described in the Powell application referred to above.

Figure 2 is an elevation, mainly in section, of the reactor of Figure 1 and is taken on the line 2—2 of Figure 1; Figure 2 shows the arrangement of the fuel-bearing channels.

Figure 3 is an elevation, partly in section, of one-half of the reactor shown in Figure 1 and shows the distribution of the fuel-bearing channels; this view is taken from a plane perpendicular to the plane of Figure 2.

Figure 4 is a vertical section of the reactor of Figures 1, 2 and 3 and is enlarged to show additional details of the coolant channels.

Figure 5 is a cross section of a portion of the reactor taken on a vertical plane and shows in section one form of the invention.

Figure 6 is an isometric view of an embodiment of a channel bushing (as shown in Figure 5) in accordance with this invention.

Figure 7 is an isometric view of a fuel body with the end of its container cut away to show the fuel body.

Figure 8 is a cross section of another embodiment of the invention with a different configuration.

Figure 9 is a graph showing the relation between pressure drop in an individual channel and the distance from the channel entrance.

The air-cooled neutronic reactor illustrated particularly in Figures 1, 2, 3 and 4 comprises an active portion 10 which is normally surrounded by a radiation shield 11. The shield usually is constructed of a dense hydrogenous material such as concrete. The active portion 10 of the reactor is a fuel-bearing moderator constructed of interlocked blocks or bricks 12 of a neutron moderating material, graphite in the structure illustrated (shown more clearly in Figure 5). Through the moderator structure are a plurality of coolant channels 14. In the reactor illustrated, the active portion 10 is divided into two equal portions 10a and 10b by a narrow gap 16 forming a passage through the center of the active portion 10 of the reactor to distribute coolant to the channels 14.

The moderator material may be any one of a number of suitable substances, graphite being particularly satisfactory for the purpose. In general, suitable moderating material for a reactor using natural uranium as a fuel is one having a "moderating ratio" greater than that of water. This ratio is defined by the expression $$\frac{\sigma_s \xi}{\sigma_c}$$

in which $\sigma_s$ is the neutron scattering cross section of the material, $\sigma_c$ is the neutron capture cross section of the material and $\xi$ is the logarithmic mean energy loss for neutron collision with an atom of the material. Generally, the moderating materials are those of low atomic number and include hydrogenous materials and beryllium in addition to graphite.

The neutronic fuel which is an isotope fissionable by thermal neutrons is in the form of rod-like elements 18 disposed in the coolant channels 14 parallel to the direction of coolant flow. The fuel element 18, as shown in Figure 7, comprises a rod-like body 42 containing a fissionable material which may be natural uranium. In the event that it is desired to avoid breeding a fissionable material, the fuel body may be a composition consisting of $U^{235}$ and thallium in the ratio of one atom of $U^{235}$ to 139 atoms of thallium. The fuel body 42 is encased in a container 44 provided with a plurality of radial, longitudinal fins 46 to increase the heat transfer surface. The fuel container may be fabricated of aluminum or other material having suitable mechanical properties and a small neutron capture cross section.

The reactor illustrated is cooled by air which enters the cooling system through air intake filters 20 (Figure 1) located on opposite sides of the reactor. Connected to the filters 20 by ducts 22 are intake manifolds 24 which girdle the reactor. The manifolds 24 communicate with the central gap 16 but are sealed from the faces 26 of the reactor which are pierced by the coolant channels. The faces 28 of the reactor not pierced by the coolant channels form a wall of the manifold so that the inflowing air may cool them. The cooling air enters through filters 20, flows through ducts 22 into manifolds 24, flows across the reactor faces 28 into the gap 16 whence the air flows into the cooling channels.

The gap 16 communicates through the fuel-containing coolant channels 14 with exhaust chambers 30 located at opposite ends of the active portion 10 of the reactor. The exhaust chambers 30 are formed partly by the faces 26 of the reactor and each chamber 30 serves one of the portions 10a and 10b. The chambers 30 are exhausted through ducts 32 by means of a blower or fan 34 which may be connected to a stack. Suitable heat exchangers 37 may be inserted in the ducts 32 to remove or recover heat from the outlet coolant air stream and to protect the blower 34.

Because heat is generated at the center of the reactor at a greater rate than near the periphery, it is desirable to regulate the flow of cooling air through the channels in relation to the rate of heat generation in any particular channel. Two constructions have been proposed in the prior art for obtaining approximately uniform surface temperature of the fuel elements: In one the quantity of fissionable material is reduced from the periphery toward the center of the reactor while maintaining the same rate of coolant flow through each channel. In the other orifices are used to restrict the flow of air through the channels roughly in accordance with the distance from the reactor center.

In the first construction the amount of fuel in the channels is varied in accordance with the distance from the periphery of the reactor and those channels closest to the center may be left without fuel. However, this construction reduces the neutron multiplication factor of the reactor, i. e., the ratio of the number of neutrons in one generation to the number of neutrons in the preceding generation. If the multiplication factor of the reactor is not substantially greater than unity, such construction is impractical.

The second construction employs flow-restricting orifices secured at the inlets or outlets of the channels, the sizes of the orifices varying to permit unrestricted flow of coolant nearest to the axis of the reactor and to decrease the flow as the distance from the center increases. In this construction the same amount of fuel is borne by each channel. The effect of such restrictions is illustrated in Figure 9 which relates the coolant pressure in a coolant channel to the distance from the channel entrance. The broken line indicates the conditions when a flow restriction is located at the channel exit. The drop in pressure from $P_0$, the entrance pressure, to $P_1$ is caused during the effective cooling flow. The remainder of the pressure drop from $P_1$ to $P_2$ is due solely to the restriction. Since the pressure drop and the coolant velocity are interdependent, the relatively small pressure drop from the channel entrance up to the restriction is indicative of a relatively low coolant velocity. This in turn has a direct effect on the amount of heat removed by a given mass of coolant since the amount of heat that can be removed is dependent on the velocity of the coolant. Thus, when the initial and terminal pressures of each channel are fixed values, as they are in practical reactors, the use of orifices as restrictions effectively wastes the heat-removal ability of the coolant. The result is a limitation on the power level of the reactor.

Evidently, both prior solutions to the problem have inherent disadvantages and, as will now become apparent, the present invention is capable of solving the problem without the handicaps of those earlier solutions.

In accordance with this invention, the flow in individual reactor channels is regulated by bushings 36 which are uniform throughout their length, as shown in Figures 4, 5 and 6. These bushings have a cross section adapted to fit snugly in the channels 14 and are generally tubular in shape, the word tubular being used in its broadest sense to indicate an elongated hollow element open at both ends. The bushings 36 are provided with interior longitudinal grooves 38 adapted to receive the longitudinal fins 46 of the fuel element 18. The walls of the grooves are preferably parallel to radii of the bushing, so that the grooves are roughly rectangular in cross section while the cross section of the ribs 41 separating the grooves is roughly trapezoidal. The ridge or land 40 between the grooves is spaced from and shaped in conformity with the exterior of the fuel element 18. The bushings 36 are pereferably fabricated of a neutron moderating material such as graphite or beryllium or of other materials of suitable mechanical properties and small neutron capture cross section. The ribbed internal structure of the bushings increases the heat transfer area of the moderator structure.

The bushings 36 cooperate with the finned fuel elements 18 to define a plurality of flow passages for coolant of uniform cross section in each channel. As shown particularly in Figures 5 and 7, the finned fuel element 18 is disposed in place in the bushing 36 with the outer portion of the fins 46 located in the grooves 38 between adjacent ribs 41. The grooves and fins are made of such depth and height, respectively, that the edges of the fins abut the bases of the grooves and thus when both are in place in the channels, as illustrated in Figure 5, the fuel element and bushing are coaxial with the axis of the flow channel in which they are inserted. As a result, each of the equally spaced six flow passages 48 between each reactor element and bushings has the same dimensions. The importance of this coaxial alignment and resultant symmetrical spacing between the external surface of the container and the internal surface of the bushing is that all portions of the fuel body are evenly cooled and thus thermal stresses are suppressed. Because the bushings are removable and because they conform exactly to the dimensions of the channels in the pile, they are preferably mounted on the fuel elements before these elements are loaded into the pile and the possible damage to the fins is thereby eliminated.

The coolant passage 48 through each channel is then defined by the exterior surface of the fuel element 18 and the interior surface of the bushing 36. The area of passage 48 and thus the flow of coolant may be adjusted most conveniently by varying the height of the ribs 41. A single size of bushing with internal ribs may be fabricated for all the channels of a reactor and the required sizes manufactured by drilling or machining to reduce the height of the ribs in any particular bushing prior to its insertion. The coolant flow distribution in the reactor is arranged so that the largest passages 48$a$ and the least restriction are near the center of the reactor while the cross sections of the passages 48$b$, closer to the reactor periphery than 48$a$, are smaller than passages 48$a$, as shown in Figure 4. The size of any individual passage may be determined in the manner familiar to those skilled in the art of heat transmission bearing in mind that the heat to be removed is proportional to the neutron flux in the channel.

The solid line in Figure 9 represents the drop in coolant pressure from the extrance to the exit of a channel provided with a longitudinally finned fuel element 18 and a bushing 36 in accordance with this invention. The terminal pressure conditions are the same as those using orifice restrictions as described above. Since a uniform passage is provided in each channel for the coolant flow, a higher linear velocity along the entire length of the channel is obtained for the same mass flow rate. The pressure drop, although equal to that obtained with an orifice, is used solely in performing the primary task of the coolant—removing heat. For a limited pressure drop and a given mass of coolant, an increased quantity of heat can be removed when the present invention is employed. The result is that the power level of the reactor may be increased without increasing the pumping requirements for the coolant.

Figure 8 illustrates a different embodiment of the invention with a diamond-shaped channel. Here the removable bushing 50 has a square cross section fitting the channel 52 snugly. The internal grooves 54 in the bushing 50 extend toward the corners of the square and have walls parallel to the diagonals of the square. The bases or roots 56 of the grooves are V-shaped to support the longitudinal fins 58 of the fuel element container 60 encasing the fuel body 62. Here again the lands 64 between the grooves are parallel to and spaced from the confronting faces of the fuel container 60. Other configurations may also be employed.

Since many embodiments may be made of this invention, such as using coolants other than air, it is not intended to limit the scope of this invention to the specific description above, but only by the claims following hereinafter.

I claim:

1. A neutronic reactor comprising an active portion having a moderator provided with a plurality of parallel channels extending therethrough, removable, tubular bushings composed of a non-fissionable material secured in said channels, said bushing material having a low capture cross section for neutrons, bodies of a material comprising an isotope fissionable by neutrons disposed in said bushings, a plurality of longitudinal fins on said bodies, the interior walls of said bushings having a plurality of spaced, longitudinal ribs separated by grooves receiving said fins, the lands between said grooves being spaced from said bodies to form flow passages, the sizes of said flow passages becoming smaller as the distance from the center of said active portion increases.

2. A neutronic reactor comprising an active portion having a moderator provided with a plurality of parallel channels extending therethrough, removable, tubular bushings composed of a non-fissionable material secured in said channels, said bushing material having a low capture cross section for neutrons, bodies of a material comprising a neutron-fissionable isotope disposed in said bushings, containers encasing said bodies, a plurality of radial, longitudinal fins on said containers, the interior walls of said bushings having a plurality of generally radial, longitudinal ribs separated by grooves receiving said fins, the lands between said grooves being spaced from and generally parallel to said container to form uniform flow passages, the sizes of said passages decreasing from the center toward the periphery of said active portion.

3. A neutronic reactor comprising an active portion having a moderator provided with a plurality of parallel channels extending therethrough, tubular bushings composed of a non-fissionable material secured in said channels, said bushing material having a low capture cross section for neutrons, rod-like bodies of a material comprising a neutron-fissionable isotope disposed in said bushings, containers encasing said bodies, a plurality of longitudinal fins on said containers supporting said bodies in coaxial relation to said bushings, the interior walls of said bushings having a plurality of generally radial, longitudinal ribs parallel to the axes of said bodies and spaced by grooves receiving said fins, the longitudinal edges of said fins abutting the bases of said grooves and the lands between said grooves being spaced from and generally parallel to said containers to form uniform flow passages, the cross section of said passages decreasing as the distance of the channel from the center of said active portion increases.

4. A fuel assembly for a neutronic reactor having a solid moderator and a channel for coolant flow through said moderator, said assembly comprising a removable tubular bushing composed of a non-fissionable material for said channel, said bushing material being a neutron moderator, a body of material comprising a neutron-fissionable isotope, a container encasing said body, a plurality of longitudinal, radial fins on said container, said bushing having a plurality of internal longitudinal ribs spaced from said container and spaced from each other by generally radial, longitudinal grooves parallel to the axis of said container and receiving said fins, said fins, body and bushing cooperating to define the coolant passage for removing heat generated in said body.

5. A fuel assembly for a neutronic reactor having a moderator and a channel for coolant flow through said moderator, said assembly comprising a removable tubular bushing composed of a non-fissionable material for said channel, said bushing material being a neutron moderator, a body of material comprising a neutron-fissionable isotope within said bushing, a container of a non-fissionable material encasing said body, a plurality of radial, longitudinal fins on said container, said bushing having a plurality of internal longitudinal ribs spaced from said container and spaced from each other by generally radial, longitudinal grooves parallel to the axis of said body and receiving said fins, the outer edges of said fins abutting the bases of said grooves, whereby said fins, container and bushing cooperate to define the coolant passage for removing heat generated in said body.

6. A fuel assembly for a neutronic reactor having a moderator and a channel for coolant flow through said moderator, said assembly comprising a removable tubular bushing composed of a non-fissionable material for said channel, said bushing material being a neutron moderator, a body of material comprising a neutron-fissionable isotope within said bushing, a container composed of a non-fissionable material encasing said body, a plurality of radial longitudinal fins on said container, said bushing having a plurality of internal longitudinal ribs spaced from said container and spaced from each other by generally radial, longitudinal grooves parallel to the axis of said body and receiving said fins, the outer edges of said fins abutting the bases of said grooves, said container, fins and bushing defining a plurality of passages for coolant around the periphery of said container, the passages having cross sections of substantially equal area for removing heat generated in said body at a rate that is uniform around the periphery thereof.

7. A neutronic reactor comprising an active portion having a graphite moderator provided with a plurality of parallel channels extending therethrough, tubular graphite bushings secured in said channels, rod-like bodies of a material comprising uranium-235 disposed in said bushings, containers encasing said bodies, a plurality of longitudinal fins on said containers supporting said bodies in coaxial relation to said bushings, the interior walls of said bushings having a plurality of generally radial, longitudinal ribs parallel to the axes of said bodies and spaced by grooves receiving said fins, the longitudinal edges of said fins abutting the bases of said grooves and the lands between said grooves being spaced from and generally parallel to said containers to form uniform flow passages, the cross section of said passages decreasing as the distance of the channel from the center of said active portion increases.

8. A fuel assembly for a neutronic reactor having a graphite moderator and a channel for coolant flow through said moderator, said assembly comprising a removable tubular graphite bushing for said channel, a body of material comprising a neutron-fissionable isotope within said bushing, a container of a non-fissionable material encasing said body, a plurality of radial, longitudinal fins on said container, said bushing having a plurality of internal, longitudinal ribs spaced from said container and spaced from each other by generally radial, longitudinal grooves parallel to the axis of said body and receiving said fins, the outer edges of said fins abutting the bases of said grooves, whereby said fins, container and bushing cooperate to define the coolant passage for removing heat generated in said body.

9. A fuel assembly for a neutronic reactor having a graphite moderator and a channel for coolant flow through said moderator, said assembly comprising a removable tubular graphite bushing for said channel, a body of material comprising a neutron-fissionable isotope within said bushing, a container composed of a non-fissionable material encasing said body, a plurality of internal longitudinal ribs spaced from said container and spaced from each other by generally radial, longitudinal grooves parallel to the axis of said body and receiving said fins, the outer edges of said fins abutting the bases of said grooves, said container, fins and bushing defining a plurality of passages for coolant around the periphery of said container, the passages having cross sections of substantially equal area for removing heat generated in said body at a rate that is uniform around the periphery thereof.

(References on following page)

References Cited in the file of this patent

UNITED STATES PATENTS

| | | |
|---|---|---|
| 418,395 | Breadner | Dec. 31, 1889 |
| 813,918 | Schmitz | Feb. 27, 1906 |
| 977,927 | Bugnon | Dec. 6, 1910 |
| 2,708,656 | Fermi et al. | May 17, 1955 |

OTHER REFERENCES

H. D. Smyth: A General Account of the Development of Methods of Using Atomic Energy for Military Purposes, August 1945, pp. 22, 177.

Applied Atomic Power, by E. S. C. Smith et al., Prentice Hall, New York (1946) pp. 126, 127, 198, 199.

Harwell: The British Atomic Energy Research Establishment (1946–1951), London, 1952, Her Majesty's Stationery Office, pp. 34–42.

U. S. Atomic Energy Comm. MDDC-893, article by F. Daniels; date declassified April 7, 1947, pp. 3, 5, 6, 8, 10, 11, 12.

Clark Goodman: The Science and Engineering of Nuclear Power, vol. II, Addison Wesley Press, Cambridge, Mass. 1949, pp. 129, 130, 140, 141, 147, 151, 152, 153.

Nucleonics, December 1949, pp. 38–44.

Nucleonics, vol. 8, No. 1, January 1951, pp. 3–6.

Atomics, June 1951, pp. 176–180.